J. H. VAN SINDEREN.
LUBRICATOR.
APPLICATION FILED APR. 2, 1913.
1,080,027.
Patented Dec. 2, 1913.
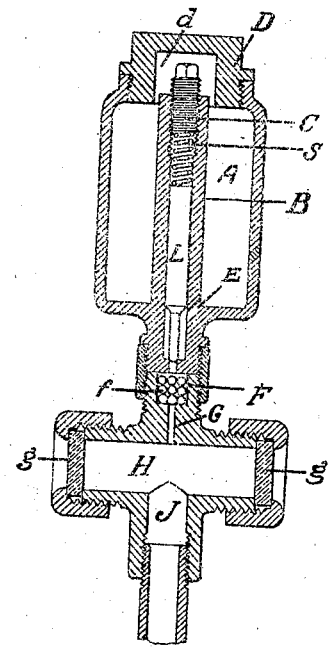
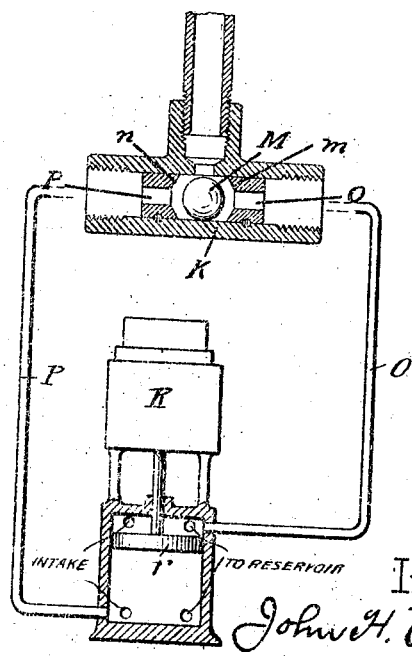
Witnesses
Beulah Carle
Grace Prior
Inventor
John H. Van Sinderen
by
Frederick W. Cameron
Atty.

UNITED STATES PATENT OFFICE.

JOHN H. VAN SINDEREN, OF ALBANY, NEW YORK.

LUBRICATOR.

1,080,027.

Specification of Letters Patent.

Patented Dec. 2, 1913.

Application filed April 2, 1913. Serial No. 758,357.

*To all whom it may concern:*

Be it known that I, JOHN H. VAN SINDEREN, a citizen of the United States of America, residing at the city of Albany, in the county of Albany and State of New York, have invented certain new and useful Improvements in Lubricators, of which the following is a specification.

My invention relates to lubricators, and the object of my invention is to provide an automatic lubricator which will be fed drop by drop and provided with a means for viewing the lubricating fluid as it drops, and also provided with a means for causing the lubricating fluid to be delivered first to one side and then to the other of an air brake pump or the like; together with such elements and combinations as are hereinafter more particularly set forth and claimed.
I accomplish these objects by means of the mechanism illustrated in the accompanying drawing, in which the figure is a longitudinal section of my device and an air brake pump partly in section.

Centrally disposed in the oil cup, A, is the tube, B, into the upper end of which I screw the adjusting plug, C. The cap, D, is placed on the oil cup preferably provided with a chamber, $d$, into which the end of the adjusting plug, C, and preferably a portion of the tube, B, projects. A passageway, E, extends through the wall of the tube, B, permitting the contents of the oil cup to pass therethrough into the tube, B, from which it passes through the obstructed passageway, F, into the pipe, G, dropping from the upper wall of the tube, H, into the pipe, J, from whence it is carried to the fitting, K. The obstruction in the passageway F, may be a number of shot, $f$, between and around which the oil will pass. In the tube, B, I place a valve, L, which will be raised by the effect of the air pressure exerted through the fitting, K, and returned by the action of the spring, S, seated against the end of the valve and the end of the plug, C. This movement of the valve, L, will cause an intermittent movement of the oil from the cup, A, through the opening, E, into the pipe, J, whereby the oil will be delivered drop by drop. By manipulating the adjusting plug, C, in the tube, B, the frequency of the drops may be regulated.

In the ends of the tube, H, are placed glass or other transparent substance, $g$, $g$, making a peek-hole through which the operator can see whether or not oil is dropping.

In the fitting K, I place the ball, M, adapted to fit a seat, $m$, at one side of the fitting, or a seat, $n$, at the other side thereof. As thus arranged, when the ball is acted upon by air from one side of an air brake pump, R, on a locomotive or a like apparatus, which air is projected through the tube, O, the ball will be forced into the fitting, $n$, and the air blowing up through the tubes, J and G, and tube, B, lifts the valve, L, and permits the oil to drop down into the fitting, K, on that side of the ball, M, toward the tube, O. When the air is blown through the tube P, it will force the ball in the seat, $m$, closing the tube, O, and permitting the oil to fall in the fitting, K, on the side thereof toward the opening, P, and be drawn therein by the exhaust occasioned by the return movement of the piston $r$, and in addition thereto the oil will be forced in when the blast comes through the tube, O.

The operation of the air brake pump, R, is well known and the oil is thus delivered to the cylinders of the pump in a very positive and direct manner. My arrangement of the valve, L, is such that when the valve is raised by the air from the pump, it will be gradually depressed by the spring, S, or fall by gravity, forcing out the oil from the tube, B, which will drop into the pipe, J, and be delivered to the cylinders of the air pump, the frequency of the dropping being regulated by the plug, C, which can be adjusted to suit the necessities or requirements of the case.

I do not limit myself to the use of a spring for closing the valve, since I can use my device very effectively without it, depending on gravity to cause the valve to descend after being raised by the air pressure.

What I claim as my invention and desire to secure by Letters Patent is:

1. An automatic lubricator, comprising an oil cup; a tube therein communicating with said cup; a valve in said tube; means for obstructing the flow of the oil from said tube; a pipe connected with a fitting mounted in position to receive oil from said tube; means for observing the passage of the oil from the tube to said pipe; means in said fitting for sealing either side of said fitting, which side depending upon the side said means is in contact with.

2. An automatic lubricator for an air brake pump comprising an oil cup; a tube therein provided with an opening for the oil near the bottom of said cup; a valve in said tube adapted to close said opening; an adjustable resilient means for limiting the action of said valve in said tube; a fitting connected with the cylinders of a locomotive air brake pump; means in said fitting for closing the connection between the fitting and one of said cylinders, while the opening between the fitting and the other of said cylinders is unobstructed; means for connecting said fitting in position to receive the oil passing from said tube.

3. An automatic lubricator, comprising an oil cup; a receptacle for receiving oil from said cup; an adjustable valve in said receptacle adapted to close said opening between the oil cup and said receptacle; a fitting connected with the cylinders of an air brake pump; means in said fitting for closing the connection between one of said cylinders in the air brake pump when the other is open; and a pipe mounted to receive the oil from said receptacle and convey it to said fitting.

In testimony whereof I have affixed my signature in presence of two witnesses.

JOHN H. VAN SINDEREN.

Witnesses:
FREDERICK W. CAMERON,
GRACE PRIOR.